April 1, 1930.   E. L. RELLER ET AL   1,752,394
ACCOUNTING APPARATUS AND SYSTEM
Filed Nov. 8, 1920   5 Sheets-Sheet 4

Patented Apr. 1, 1930

1,752,394

UNITED STATES PATENT OFFICE

EDWIN L. RELLER AND VICTOR R. A. STROH, OF ST. LOUIS, MISSOURI, ASSIGNORS, BY MESNE ASSIGNMENTS, TO REMINGTON RAND INC., OF NEW YORK, N. Y., A CORPORATION OF DELAWARE

ACCOUNTING APPARATUS AND SYSTEM

Application filed November 8, 1920. Serial No. 422,657.

This invention relates to an accounting apparatus and system, and more particularly to an apparatus adapted for the finding of accounts.

In the accounting apparatus and system described in application Serial Number 352,601, filed January 19, 1920, now Patent No. 1,615,806, and also in British Patent No. 153,344, dated November 2, 1920, the desired account is found by series of steps comprising primary, secondary and tertiary operations in accordance with the given system of classification, such as the numerical or decimal system. Accordingly, the account cards are arranged in a tray or trays and each tray is divided by transevrse partitions into units or compartments. The account cards are further, in a general way, divided into groups, the groups divided into divisions, and the divisions are divided into cards. Accordingly in order to effect selection of a given account by the successive operation of selective manipulative elements or keys, the selecting mechanism employed is primarily located or adjusted to locate a group, secondarily to locate a division of the located group, and tertiarily to locate the desired card in the located division. The selectors are then operated to isolate the finally located card.

The cards of a unit or division have selective characteristics variantly arranged along the edges thereof (such as the bottom edges) so as to permit cooperation therewith by the selectors, in order to effect location and selection of any individually desired card in the unit or division.

Where the cards are wide, it is necessary to engage the selectors with the selective characteristics on the card at spaced points, otherwise the forces will be such as to cause liability of tipping and, therefore, binding of the card. Where, however, the cards are narrow, such liability of binding or tipping is reduced even if the selector engages only one point on the card.

In the keeping of accounts, cards of different widths are utilized requiring trays of different sizes, and often the keeping of accounts can be accomplished with two or more sizes of cards, the most narrow card having the width of not over one-half of the widest card. Accordingly it is desirable to employ a standard width tray and provide a partition whereby the tray may be divided into compartments so as to take the narrow cards.

One of the objects of this invention, therefore, is to provide an apparatus of the character described, employing a sectional tray together with selecting mechanism which is arranged to cooperate with the cards in any of the sections.

Another object of this invention is to provide an apparatus of the character described, the selecting mechanism of which is susceptible of adjustment or operation so that when a sectional tray is used, the mechanism is adapted for selective cooperation with the cards in either section or in both sections.

Another object is to provide an apparatus of the character described, employing a plurality of selector sections which are arranged to be rendered effective selectively or concurrently and to provide therefor selective manipulative means.

Another object is to provide a tray of novel construction, adapted to receive cards for selective cooperation therewith of selector mechanism, and which is arranged to form either a single compartment along the tray without a partition or division or by suitable division a plurality of compartments therealong.

Further objects will appear from the detail description taken in connection with the accompanying drawings, in which.

In most of the views, parts have been omitted, more especially parts of the apparatus in general as illustrated in the patent referred to; this has been done to more clearly illustrate and set out the structural features of this invention as distinguished from the machine of the patent referred to. Reference is, however, made to the patent referred to for details of construction.

In the specification and claims, the term "card" is used in its broadest sense, so as to cover ordinary loose leaves, cards, sheets and other accounting elements. Similarly, the word "tray" is used in its broadest sense, so as to include the various forms of holding means adapted for the holding, retaining or segregation of accounts.

Referring now to the accompanying drawings, a brief description will first be given of the apparatus as a whole. The machine comprises a base 1 having side plates 3 mounted therein and forming standards for the different mechanism.

Supported in the plates 3, as fully shown and described in the patent referred to, is a tray 4 which is adapted to receive cards 5, each of which is provided with selective characteristics 6 adapted for engagement by selectors 7. The tray is divided by transverse partitions 8 into a series of compartments (one hundred for a tray of one thousand cards) and in the bottom of the tray, which is open to receive the selectors, are arranged comb strips 9, one at the bottom of each partition, so as to form guides for the selectors in order to insure the engagement of these selectors with the selective characteristics on the cards.

The selectors 7 are mounted for vertical movements upon the side bars 10 of a selector carrier, and these selectors are bridged by bridges 11 arranged to form continuations of the selectors so as to form therewith audit selectors. These bridges are also mounted for vertical movements on the carrier side bars so as to move with the selectors when interlocked therewith. The carrier side bars 10 are mounted for longitudinal sliding movement upon the side bars 12 of a carriage, which side bars have heads 13 at their ends sliding between guide bars 14 connecting the plates 3, so as to permit transverse movement of these carrier side bars. In order to cause the side bars 12 to execute parallel movements, they are connected by links 15 to the arms 16 of bell crank levers, the other arms 17 of which are connected by links 18. It is to be noted that there is a set of these bell cranks and link connections at each end of the machine, so that the side bars 12 are compelled to execute parallel movements.

Mounted in the heads 13 are rock shafts 19, each of which has splined thereto a clutch 20 adapted to cooperate with a clutch element 21 on a selector. It is to be understood that there is a series of ten pairs of selectors along the machine, and accordingly there is a series of ten pairs of clutches along the rock shafts 19. The clutches 20 are actuated by bell-crank levers 22 mounted in a support 23 on the base 1, and these bell-crank levers are arranged to be actuated by bell-crank levers 24 arranged to be controlled by links 25 from keys 65 on the main keyboard.

The rock shafts 19 have connected therewith arms 26 which are connected with links 27 having heads 28 embracing a bar 29 on a rock shaft 30, so that upon oscillation of the rock shaft 30, the rock shafts 19 will be rocked so as to cause the clutches 20 when connected with a pair of selectors 7 to raise these selectors.

The mechainsm so far described is fully shown and described in the disclosures referred to and further detail description is, therefore, unnecessary. It will, however, be well to briefly give a résumé of the operations when used without the dividing partition which is one of the particular features in this application.

It will be noted that there are one hundred compartments for ten cards each, arranged along the tray and that a group of ten cards has selective characteristics along its lower edges corresponding to the ten cards in the unit. Furthermore, there are ten sets of selectors corresponding to the ten primary locations, that is, corresponding to the ten groups of one hundred cards each. The selector carrier as a whole is also arranged to be positioned in ten different positions along the tray corresponding to the ten secondary locations and corresponding to the ten divisions or compartments of ten cards each in each group.

Furthermore the carriage is arranged to be expanded transversely so as to position the set of selectors in any desired one of ten different positions along the bottoms of the cards. The clutches 20 are controlled by the primary selective manipualtive elements or keys, one for each digit in the primary order; the positions of the carrier along the tray are controlled by the secondary selective manipulative elements or keys, one for each position or digit in the secondary order; the transverse positions of the selectors are controlled by tertiary selective manipulative elements or keys, one for each position or digit in the tertiary order.

If, for instance, it is desired to select card number "$12^2$," the operation will be substantially as follows: The depression of the primary key will clutch to the rock shafts 19 the "100" pair of selectors so as to render these selectors effective for operation, leaving all of the other selectors disconnected. Upon depression of the "2" key, the selector carrier will be shifted so that the "1" selectors will be directly underneath the "20" compartment in the "100" group. Upon depression of the #"2" key again, the selector carriage, its selector carriers and the selectors thereon will be moved outwardly until the selectors are underneath the "2" characteristics on the cards. When now the rock shafts 19 are rocked, which automatically takes place upon depression of the final or tertiary key, only the selectors which are now located under and in alinement with the characteristics of the "2" card in the "20" division or compartment of the "100" group will be raised so as to cause elevation of card "12²" leaving all other cards undisturbed.

When it is desired to audit the accounts by concurrently raising all cards which end in a certain number, the audit bars or bridges 11 are interconnected with the selectors 7 and all clutches are engaged with the selectors, this taking place upon depression of a special audit key. This also automatically eliminates the ordinary primary and secondary locations. Accordingly, upon depression of any key, for instance, the "2" key, the selector carrier will be expanded so as to place the selectors as well as the audit bars at the "2" positions under all of the characteristics of all of the "2" cards and accordingly, upon elevation of the selectors by movement of the rock shafts 19, all cards ending in "2" will be raised.

It will be noted that there are two sets of selectors and accordingly, there are provided a pair of selector mechanism sections arranged longitudinally of the machine. These sets of mechanism are employed so as to provide for selector cooperation with the card at spaced points, in order to lift a card at spaced points and thus prevent tipping and binding of a wide card as heretofore described. These selector mechanism sections are normally interconnected through the arms 26 and links 27 and the heads 28 operated by a common actuator 29—30. The selector mechanism sections are, however, in a general way separate.

Figures 1, 9:
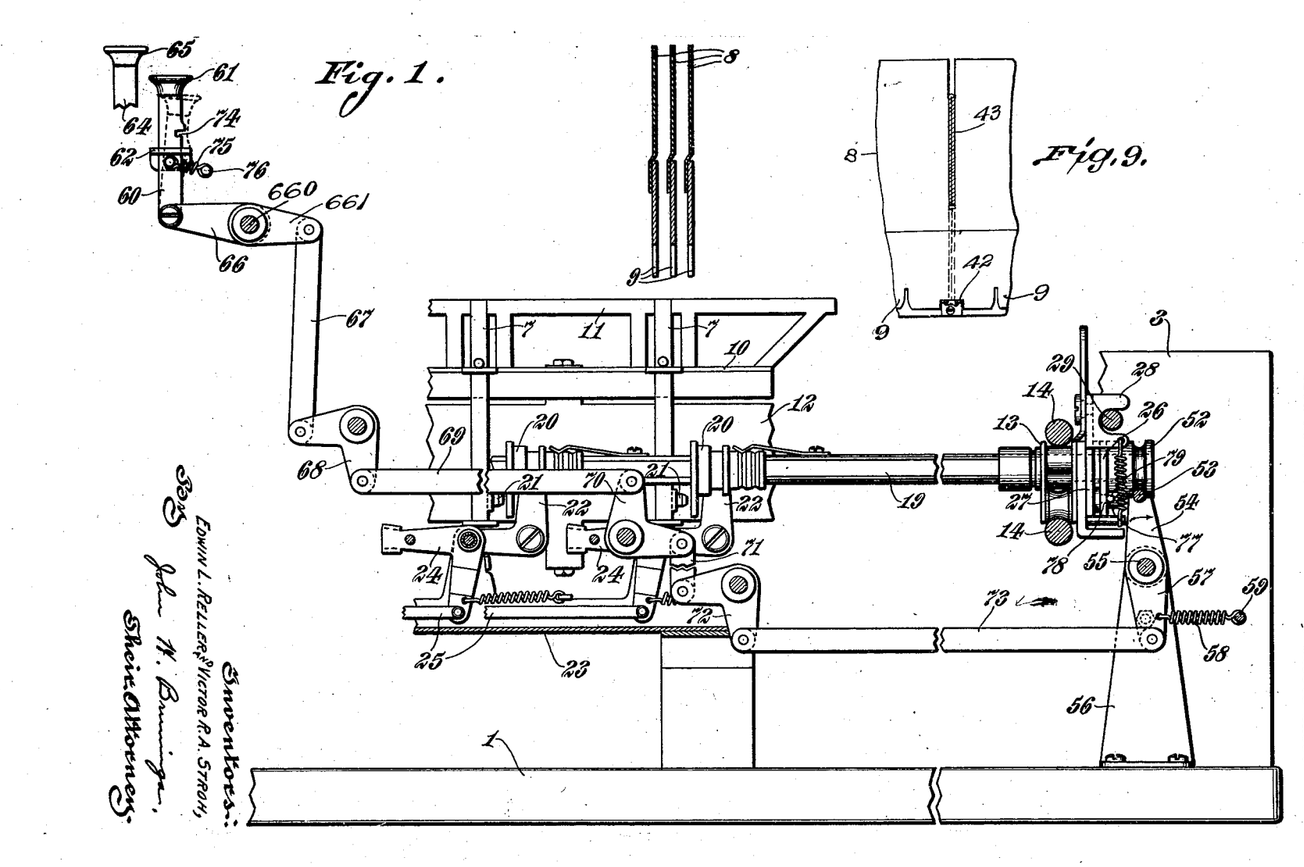
Figure 1 is a side elevation partly in section of a part of an account finding apparatus embodying this invention.
Figure 9 is a detail section of the tray showing the arrangement of the transverse and longitudinal partitions.
Figure 2:
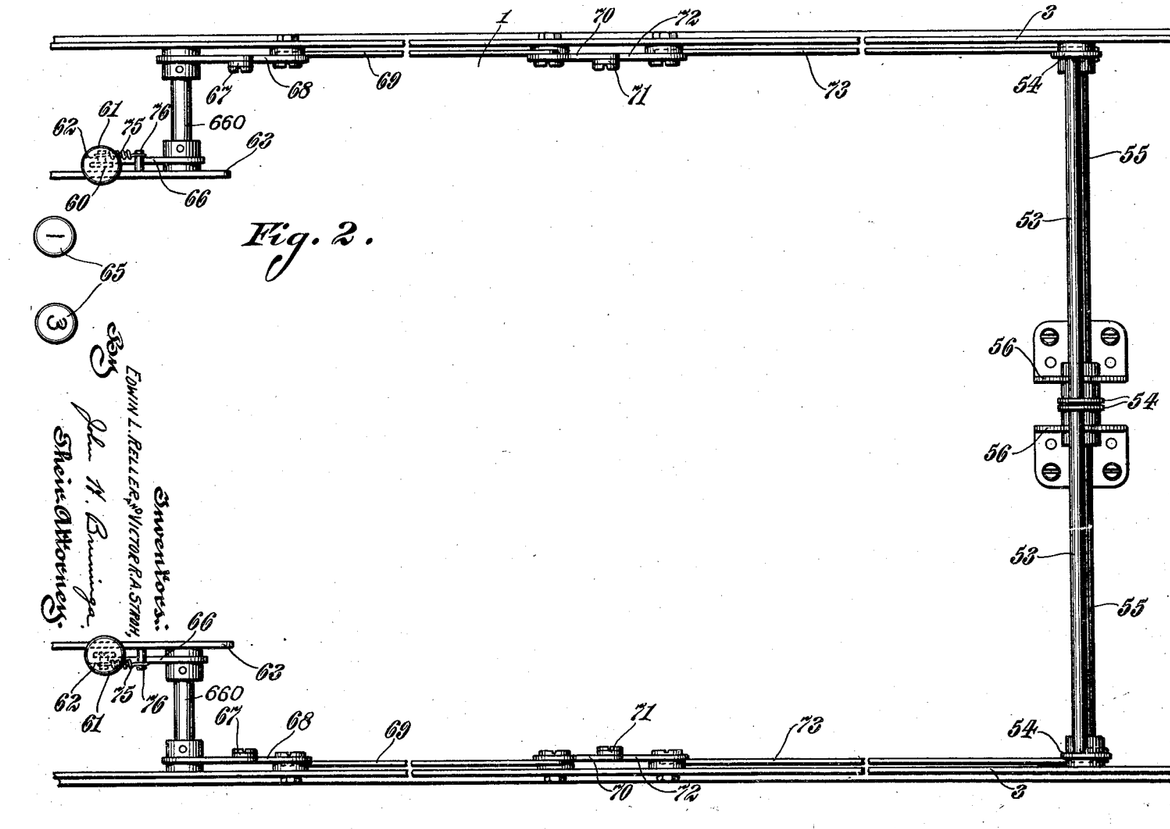
Figure 2 is a plan.
Figure 6:
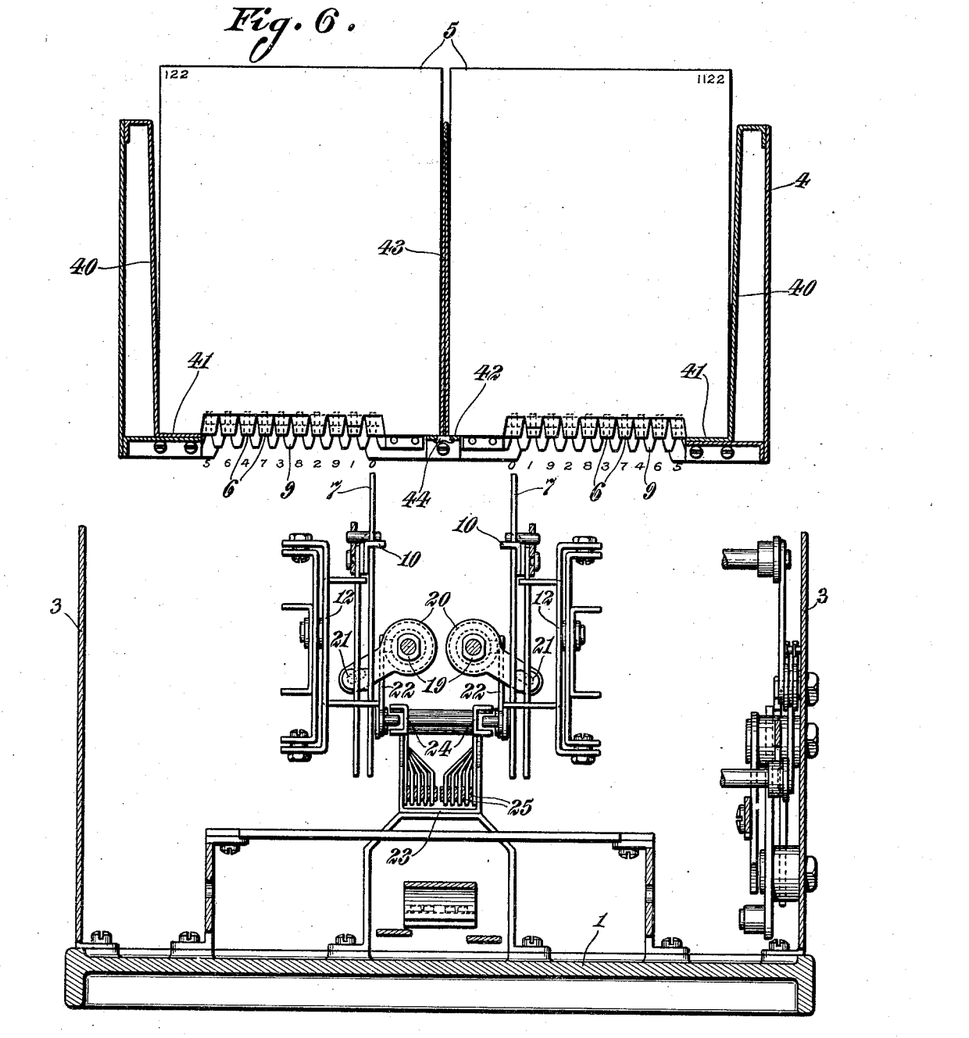
Figure 6 is a transverse vertical section of the apparatus.

Referring now to Figure 6, the tray 4, which has flared card-edge-engaging side walls 40 bent at right angles, as shown at 41, to provide rests for the ends of a wide card, has also a strip 42 extended therealong centrally thereof so as to provide supports and connections for and between the guide strips 9, as fully described in the patent referred to. Now in accordance with this invention, the tray is provided with a partition 43 extending therealong and centrally thereof. This partition may be formed of a sheet of metal doubled to provide for strength, and it is secured in position by providing lugs 44 at intervals along its lower edge to take into corresponding slots in the strip 42. By the use of suitable tools, these lugs 44 may be loosened from strip 42 and the partition 43 removed to make a single compartment for wide cards. Accordingly, the tray is divided into two sections, each of which is adapted to receive a series of cards 5. It will be understood, of course, that in such a structure, the transverse partitions 8 for the compartments are bridged by the longitudinal partitions 43 by slitting the partitions 8 and 43 in any suitable manner as shown in Figure 9. In the complete tray, therefore, two series of tray sections or compartments are provided extending along the tray, each of which is adapted to receive a set of cards, the cards resting on the lugs 41 and the strip 42.

In accordance with this invention, the selector mechanism sections are normally connected with the main actuator for the rock shafts 19. Mechanism is, however, provided for rendering ineffective either or both of the selector mechanism sections; this is accomplished in the particular embodiment, by detachable connections between the main actuator 29 and the rock shafts 19. The mechanism for effecting selectively such connection and disconnection is, however, in duplicate for the two sections and a preliminary detail description of one will, therefore, be sufficient.

Figure 3:
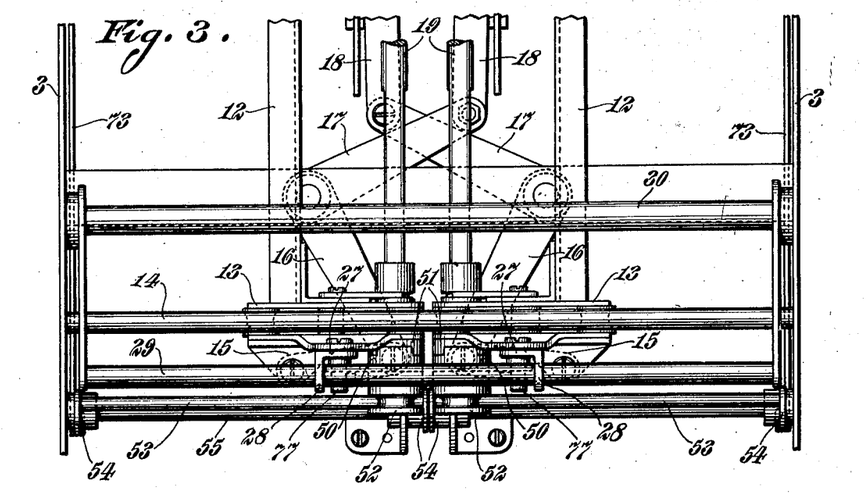
Figure 3 is a detail plan view showing the rear end of the machine.

Referring to the drawings, the arm 26 is loosely mounted on the rock shaft 19 and is also slidable longitudinally thereon. This arm has on one side thereof a hub 50 adapted to cooperate with a hub 51, mounted for rotative movement in the head 13 and held against endwise movement therein, but in which the rock shaft 19 is splined. The hubs 50 and 51 have cooperating jaw clutch faces as shown in Figure 3, so that when these clutch faces are in engagement, the arm 26 is connected with the rock shaft whereby upon rise of the arm 26, the rock shaft will be rocked in accordance therewith; when, however, the arm 26 is moved rearwardly so as to disengage the clutch faces, the arm 26 will rock idly without imparting movement to the rock shaft.

The arm 26 has formed on and fixed to its side opposite to the hub 50, a hub 52 which is grooved to receive a cross bar 53 mounted on arms 54 on the rock shaft 55 mounted in a bracket 56 and one of the side plates 3. One of the arms 54 is extended as shown at 57 in Figures 1 and 4, and to this arm is connected one end of a spring 58, the other end of which is connected to a pin 59 on the side plate 3. Accordingly, this spring tends to normally maintain the clutch faces in engagement so as to normally connect the arm 26 with the rock shaft 19, and therefore, normally render effective for operation the corresponding selector mechanism sections.

The arm 57 is connected with the shank 60 of a key 61 passing through a slot in a bracket 62, mounted on a side plate 63, suitably supported on the base 1, which supports the shanks 64 of the main keys 65 as fully described in the patent referred to. The train of mechanism between the key 61 and the arm 57 comprises an arm 66 fixed to a rock shaft 660 journalled in plates 3 and 63, an arm 661 on the rock shaft, a link 67, a bell-crank lever 68 mounted on the plate 3, a link 69, a bell-crank lever 70 mounted on the plate 3, a link 71, a bell-crank lever 72 mounted on the plate 3, and a link 73 connected with the arm 57. In order to hold the key 61 in depressed position, its shank 60 is provided with a notch 74, which upon complete depression, is caused to take over the edge of the bracket 62, by the action of the spring 75 anchored at 76 on the plate 63. Accordingly, when the key is moved to dotted position, Figure 1, it will be locked in position but when moved back, it will again rise under the tension of the spring 58.

Accordingly, if the key 61 is depressed, it will operate to swing the arm 54 in the direction of the arrow, thereby causing the clutch faces on the hubs 50 and 51 to disengage so as to disconnect the arm 26 from its corresponding rock shaft, whereby upon rocking of the actuator 29, the arm 26 will rock idly on the rock shaft without turning it and accordingly the selectors for that section will remain inactive while the rock shaft for the other section will remain active.

Figure 4:
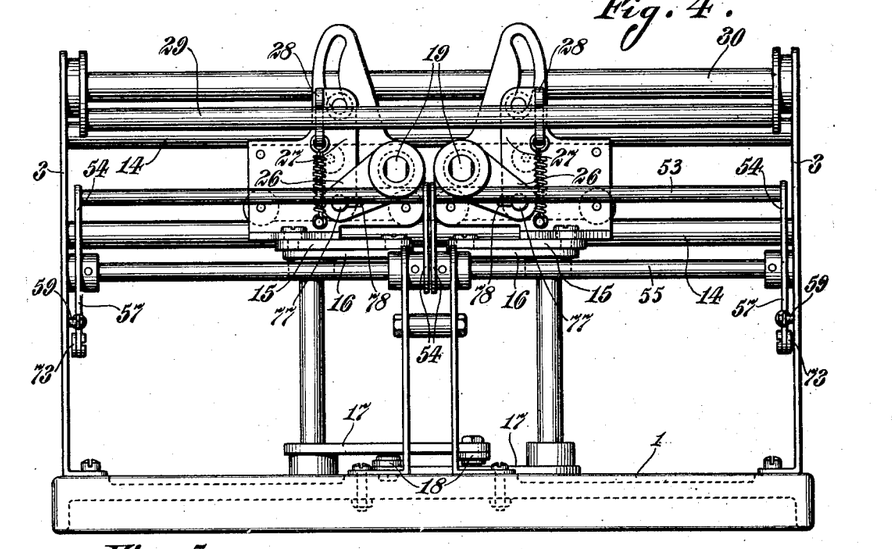
Figure 4 is an end elevation.
Figure 5:
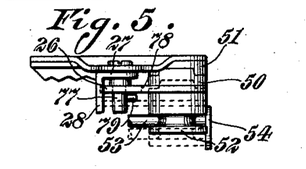
Figure 5 is a detail of the positioning means.

It is desirable that after the arm 26 has been unclutched or disconnected from its rock shaft, the connection be not restored until the arm 26 is returned to normal position, as shown in Figure 4. Accordingly the pin 77 connecting the arm 26 with the link 27 is lengthened so that the arm can slide thereon. The arm is further provided with a slot 78 slightly larger than and adapted to mesh with a pin 79 projecting from the pin 77. Accordingly when the arm 26 is in normal position, as shown in Figure 4, it can move freely inward and outward to clutch and unclutch it from the rock shaft. After, however, the arm has moved outward to unclutching position, then upon movement of the arm, the pin 79 will move out of alinement with the slot 78 and it will not again come into alinement until the arm 26 is restored to normal position. Accordingly after the clutch has once been shifted to disconnect the arm 26 from the rock shaft and even if the key 61 is again released, clutching action will not take place until the arm 26 has been restored back to normal position. Furthermore no unclutching action can take place until the arm 26 is in normal position. This insures that the rock shaft and the parts connected thereto will be in normal position with the selectors completely dropped before the mechanism can be altered in its action.

It is, of course, understood and will be clear from a reference to the drawings that the mechanism is duplicated on both sides of the machine, there being a key or selective manipulative element for each section. It will further be noted that the unclutching mechanism is so constructed that it will not interfere at all with the expanding and contracting movements of the carrier side bars and the mechanisms mounted thereon.

It will, therefore, be seen that there is provided in this apparatus a tray which is arranged to be divided into a series of tray sections, each adapted to receive its own set of cards, and that the selector mechanism is divided into a series of selector mechanism sections corresponding to the tray sections. The selector mechanism sections are arranged to be selectively rendered effective and ineffective so that only one or both of the sections may operate to select cards in one or both tray sections. When only one selector mechanism section is effective, only that mechanism will elevate cards in the corresponding tray section. When, however, both are effective, the cards will be selected in both tray sections, or if the partition is removed, a wide card or cards can be selected.

Suppose, for an example that it is desired to select card "122". To effect such selection, the key corresponding to the left or first tray section will be maintained raised so as to keep effective the selector mechanism section corresponding to that tray section, while the key for the right tray section is left depressed whereby the selector mechanism section for that tray section will become or remain ineffective. By them operating the keys 65 on the main key board, as fully described in the patent referred to, the selector mechanism sections will move successively to primary and secondary selected or adjusted positions or locations, but upon depression of the final or tertiary key, the selectors of the right section will remain ineffective, while the selector of the left section will be raised to elevate the desired card. In a similar manner, any desired card in the right section may be selected providing that the left key 61 is depressed and the right key 61 is raised.

Figure 7:
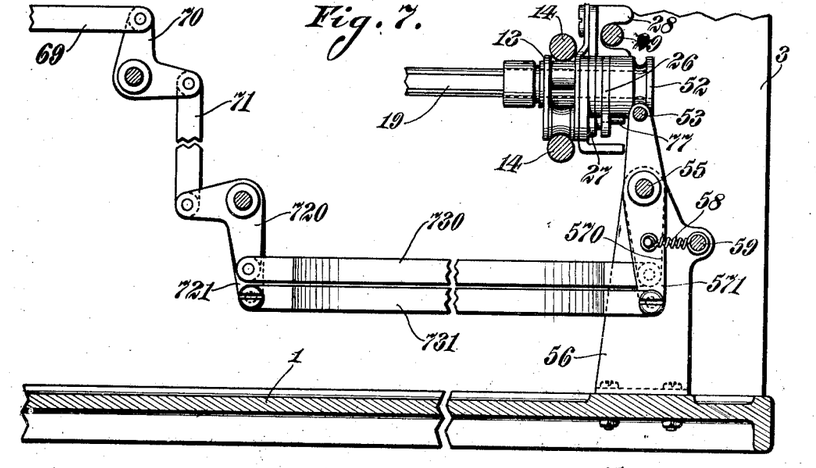
Figure 7 is a detail view similar to Figure 1, but illustrating another embodiment of this invention.
Figure 8:
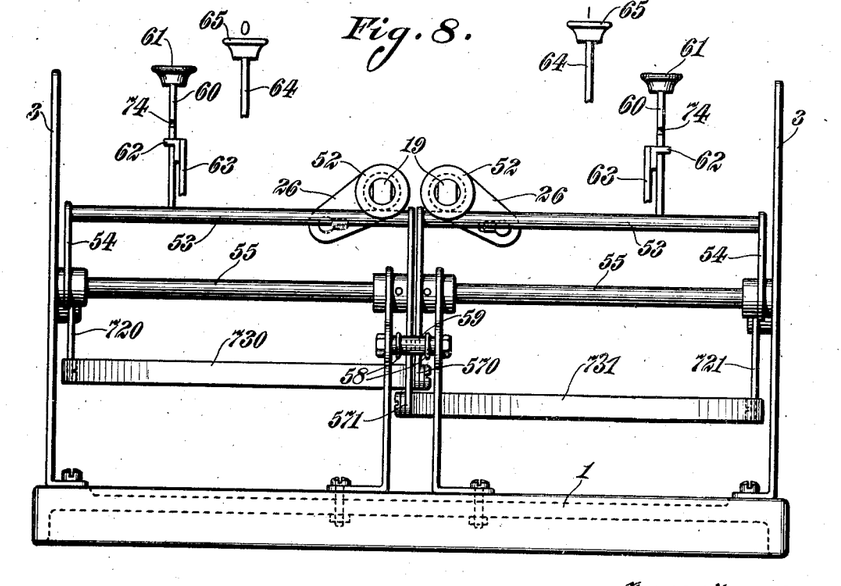
Figure 8 is a view of Figure 7 similar to Figure 4.

In the embodiment previously described, the keys 61 really act as eliminating keys, that is, a key 61, which opposes a certain division or tray section, upon being depressed, eliminates the selector mechanism section corresponding to that key and to the tray section, leaving the other selector mechanism section connected. While this is a satisfactory construction, it is desirable to have the keys 61 so arranged that upon depression of a key opposite a tray section, the corresponding selector mechanism will be maintained operative, while the other selector mechanism section will be eliminated. Referring to Figures 7 and 8, in which similar parts have been designated by the same reference characters as in Figures 1 to 6 inclusive, the keys 61 are connected with the rock shafts 55 in such a manner that, for instance, the left key 61, Fig. 8, is connected to actuate the right rock shaft 55 so as to disconnect the right rock shaft 19. This is accomplished by cross connections as follows:

The links 71, connected with the respective keys 61, are connected with bell crank levers 720 and 721 respectively. The bell-crank lever 721, connected with the left key 61, Fig. 8, is connected by a link 730 with an arm 570 on the right rock shaft 55; while the bell-crank lever 720, connected with the right key 61, Fig. 8, is connected by a link 731 with an arm 571 on the left rock shaft 55.

With these cross connections, it will be seen that, upon depression of the left key 61, Figure 8, the right rock shaft 55 will be oscillated to unclutch the right rock shaft 19 and its selectors, leaving the left rock shaft 19, and its selectors, connected. Similarly, upon the depression of the right key 61, the right rock shaft 19, and its selectors, will remain connected, while the left rock shaft 19, and its selectors, will become disconnected. Accordingly, upon the depression of any key 61 corresponding to the tray section opposite it, the selector mechanism section corresponding to that key and tray section will remain effective and connected, while the other selector mechanism section will become disconnected.

It will, therefore, be seen that this mechanism is adapted to select, with one selecting mechanism, any one of a series of two thousand cards, in view of the fact that the keys 61 form the selective manipulative element of a higher order. Accordingly, the left key can be marked "0" and the right key "1" or in any other suitable manner to correspond to the system of classification employed. This mechanism is also of special utility in the auditing of accounts. For instance, if it is desired to find a misplaced or lost account, upon depression of the audit key, as described in the patent referred to, the audit bars 11 are interconnected with the selector bars 7, while all of these selector bars are connected with the rock shafts 19. During this auditing, either or both mechanism sections can be left connected and effective for operation depending upon whether it is desired to simultaneously audit only one tray section or both tray sections. It is of particular advantage where both tray sections are simultaneously to be audited, for in such a case all cards ending in a certain number will be elevated concurrently. Accordingly, the time for auditing an account is considerably reduced.

It will also be noted that if both selector mechanism sections are maintained effective for actuation, then upon the depression of any key, the mechanism will simultaneously elevate two cards ending in the same number. This is very often of advantage in some systems of classification where it is desired to simultaneously find related accounts.

It is obvious that various changes may be made in details of construction without departing from the spirit of this invention; it is, therefore, to be understood that this invention is not to be limited to the specific details shown and described.

Having thus described the invention, what is claimed is:

1. An apparatus of the character described, comprising, a tray embodying a plurality of sections each having cards therein, selecting mechanism, and a means for selectively controlling said mechanism so as to cooperate with the cards in any chosen one of said sections.

2. An apparatus of the character described, comprising, a tray embodying a plurality of sections each having cards therein, selecting mechanism, and a means for selectively causing said mechanism to cooperate with the cards in a chosen section.

3. An apparatus of the character described, comprising, a plurality of tray sections each having cards therein, a selector for each section, and common means for operating said selectors.

4. An apparatus of the character described, comprising, a plurality of tray sections each having cards therein, a selector for each section, and common means for selectively operating said selectors.

5. An apparatus of the character described, comprising, a plurality of tray sections having cards therein, a plurality of selectors corresponding to said sections, and common means for selectively operating said selectors.

6. In apparatus of the character described, comprising, a tray divided to form a plurality of tray sections each having cards arranged in groups and divisions therein, a plurality of sets of selectors corresponding respectively to said sections, and means for selectively operating one of said selectors with respect to a particular group of cards and a division of the located group, in the section corresponding to that selector.

7. An apparatus of the character described, comprising, a tray divided to form a plurality of tray sections each having cards arranged in groups and divisions therein, a plurality of sets of selectors corresponding respectively to said sections, and means for selectively operating one of said selectors with respect to a particular group of cards, a division of the located group and a card of the located division, in the section corresponding to that section.

8. An apparatus of the character described, comprising, a plurality of tray sections having cards therein, a plurality of sets of selectors corresponding respectively to said sections, actuating means for each set of selectors corresponding to a particular section, and means for locating one of such selectors with respect to the cards in such section.

9. An apparatus of the character described, comprising, a plurality of tray sections having cards therein, a plurality of sets of selectors corresponding respectively to said sections, actuating means for controlling operation of any set of selectors corresponding to a particular section, and means for locating one of such selectors with respect to a unit of the cards in such section.

10. An apparatus of the character described, comprising, a plurality of tray sections having cards therein, a plurality of sets of selectors corresponding respectively to said sections, a plurality of keys, means actuated by said keys for controlling operation of any set of selectors corresponding to a particular section, and means for selectively actuating one of such selectors with respect to a group of cards in such section and with respect to a division of such group.

11. An apparatus of the character described, comprising, a plurality of tray sections having cards therein, a plurality of sets of selectors corresponding respectively to said sections, actuating means for controlling operation of any set of selectors corresponding to a particular section, and means for selectively actuating one of such selectors with respect to a group of cards in such section, with respect to a division of such group and with respect to a card of such division.

12. An apparatus of the character described, comprising, a plurality of tray sections having cards therein, a plurality of sets of selectors corresponding respectively to said sections, and means for simultaneously operating a plurality of said selector sets.

13. An apparatus of the character described, comprising, a plurality of tray sections having cards therein, a plurality of sets of selectors corresponding respectively to said sections, and means for selectively controlling operation of one or more of said sets of selectors.

14. An apparatus of the character described, comprising, a plurality of tray sections having cards therein, a plurality of sets of selectors corresponding respectively to said sections, a plurality of keys, and means actuated by said keys for controlling operation of either of the different sets of selectors.

15. An apparatus of the character described, comprising, a plurality of tray sections having cards therein, a plurality of sets of selectors corresponding respectively to said sections, a plurality of keys, and means actuated by said keys for selectively controlling operation of one or more of said sets of selectors.

16. An apparatus of the character described, comprising, a plurality of tray sections divided by a removable partition having cards therein, a plurality of sets of selectors corresponding respectively to said sections, a plurality of keys, means actuated by certain of said keys for selectively controlling operation of a particular selector in a position adjacent a desired card, and means for operating such selector.

17. An apparatus of the character described, comprising, a plurality of tray sections divided by a removable partition having cards therein, a plurality of sets of selectors corresponding respectively to said sections, a plurality of keys, means actuated by certain of said keys for controlling operation of a particular selector, means for positioning such selector with respect to the desired card in the corresponding section, and means for operating such selector.

18. An apparatus of the character described, comprising, a plurality of tray sections having cards therein, a plurality of sets of selectors corresponding respectively to said sections, a plurality of keys, means actuated by said keys for controlling operation of either of said sets of selectors, and means for operating such selectors.

19. An apparatus of the character described, comprising, a plurality of tray sections having cards therein, a plurality of sets of selectors corresponding respectively to said sections, means for selectively controlling operation of one or more of said sets of selectors, and means for operating said sets of selectors.

20. An apparatus of the character described having cards therein, comprising, a plurality of selector mechanism sections, and means for selectively actuating one of said sections for the elevation of one of said cards.

21. An apparatus of the character described, comprising, a plurality of normally effective selector mechanism sections, and selective manipulative means adapted to render said sections ineffective.

22. An apparatus of the character described, comprising, a plurality of normally effective selector mechanism sections, and selective manipulative means adapted to render one or more of said sections ineffective.

23. An apparatus of the character described having cards therein, comprising, a plurality of tray compartments each having a series of card-receiving divisions, a plurality of selector mechanism sections corresponding respectively with said compartments, and means for selectively actuating one of said sections for the elevation of one of said cards.

24. An apparatus of the character described comprising a tray, a partition adapted to divide said tray into a plurality of tray sections, each having cards arranged in groups therein, a plurality of sets of selectors corresponding respectively to said sections, a plurality of actuating keys, and connecting means between said keys and said selectors adapted to locate the latter with respect to a group of cards in the corresponding section and with respect to a card in the located group.

25. An apparatus of the character described having cards therein, comprising a plurality of selector mechanism sections, and means for both selectively actuating one or more of said sections and for elevating one or more of said cards.

26. An apparatus of the character described having cards therein, comprising a plurality of selector mechanism sections, and selective manipulative means adapted to both selectively actuate one of said sections and elevate one or more of said cards.

In testimony whereof we affix our signatures this 22nd day of September, 1920.

EDWIN L. RELLER.
VICTOR R. A. STROH.